(12) United States Patent
Tankersley et al.

(10) Patent No.: US 12,088,238 B1
(45) Date of Patent: Sep. 10, 2024

(54) SOLAR PANEL TRACKER SYSTEMS AND METHODS

(71) Applicant: Terrasmart, Inc., Buffalo, NY (US)

(72) Inventors: Jason Tankersley, Sandia Park, NM (US); Toby Holden, Fort Myers, FL (US); Kevin Conner, Estero, FL (US)

(73) Assignee: Terrasmart, Inc., Buffalo, NY (US)

( * ) Notice: Subject to any disclaimer, the term of this patent is extended or adjusted under 35 U.S.C. 154(b) by 0 days.

(21) Appl. No.: 17/030,241

(22) Filed: Sep. 23, 2020

Related U.S. Application Data

(60) Provisional application No. 62/904,510, filed on Sep. 23, 2019.

(51) Int. Cl.
*H02S 20/32* (2014.01)
*F16M 11/10* (2006.01)
*F16M 11/22* (2006.01)
*H02S 30/10* (2014.01)

(52) U.S. Cl.
CPC ............. *H02S 20/32* (2014.12); *F16M 11/10* (2013.01); *F16M 11/22* (2013.01); *H02S 30/10* (2014.12)

(58) Field of Classification Search
CPC .......... H02S 20/00; H02S 20/10; H02S 20/30; H02S 20/32; H02S 30/10; F16M 11/10; F16M 11/22; Y02E 10/47
See application file for complete search history.

(56) References Cited

U.S. PATENT DOCUMENTS

| | | | |
|---|---|---|---|
| 8,316,590 B2 | 11/2012 | Cusson | |
| 8,656,659 B2 | 2/2014 | Plaisted | |
| 2009/0050194 A1 | 2/2009 | Noble et al. | |
| 2018/0091088 A1 | 3/2018 | Barton et al. | |
| 2018/0248508 A1 | 8/2018 | Keller et al. | |
| 2019/0305163 A1 | 10/2019 | Li et al. | |
| 2020/0032831 A1* | 1/2020 | Almy | F24S 30/42 |
| 2020/0059194 A1 | 2/2020 | Anderson et al. | |
| 2020/0072505 A1* | 3/2020 | Hudson | H02S 20/10 |
| 2020/0076354 A1* | 3/2020 | West | E02D 5/801 |
| 2020/0076355 A1* | 3/2020 | Hudson | F24S 25/70 |
| 2020/0116394 A1* | 4/2020 | West | H02S 20/32 |
| 2020/0248424 A1* | 8/2020 | Hudson | E04H 12/2269 |
| 2021/0017729 A1* | 1/2021 | Karkheck | E02D 5/801 |

* cited by examiner

*Primary Examiner* — Mayla Gonzalez Ramos
(74) *Attorney, Agent, or Firm* — Butler Snow LLP; Jon E. Holland

(57) ABSTRACT

A solar panel tracker system is highly reliable and facilitates installation particularly on terrains that are uneven or sloped. The system includes a frame having legs that are coupled to and support a base for a bushing housing assembly that is designed to rotate one or more photovoltaic (PV) solar power panels. Each of the legs is connected to a telescoping support structure that can be adjusted in a vertical direction to accommodate a desired height above sloping terrain. Each of the legs is connected to its respective telescoping support structure with a coupler passing through a slotted bracket thereby allowing adjustment of the leg in a horizontal direction during installation. In addition, the bushing housing base may be coupled to the frame with one or more U-bolts thereby allowing the bushing housing base and thus the bushing housing assembly to rotate during installation.

20 Claims, 12 Drawing Sheets

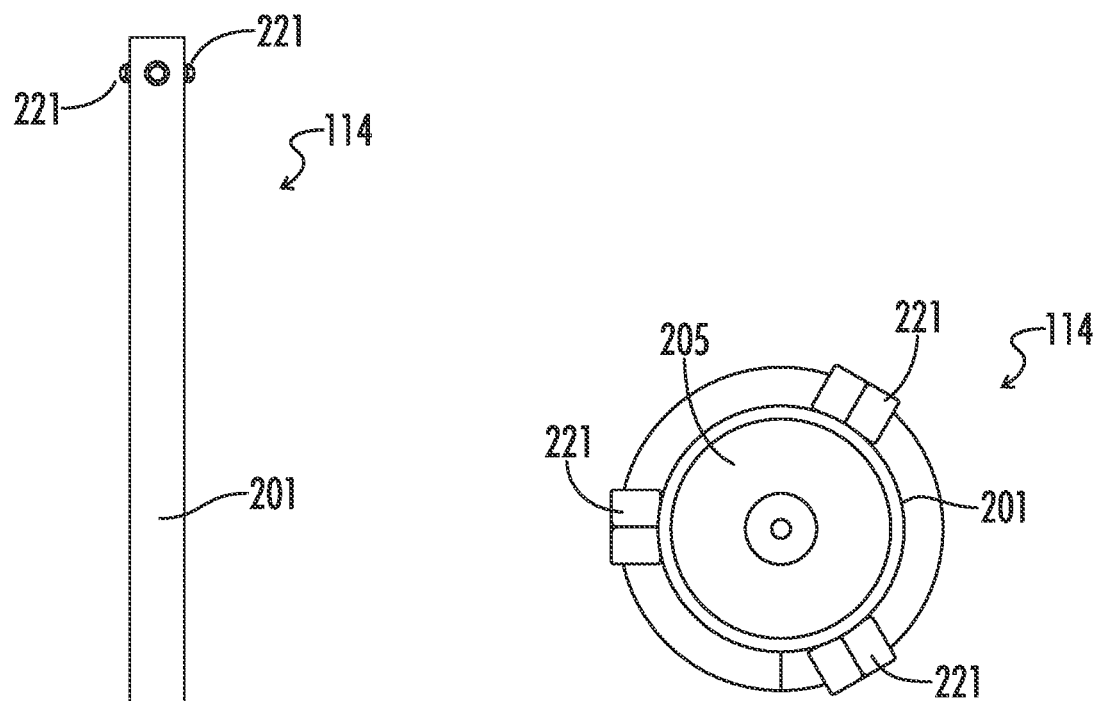
FIG. 14
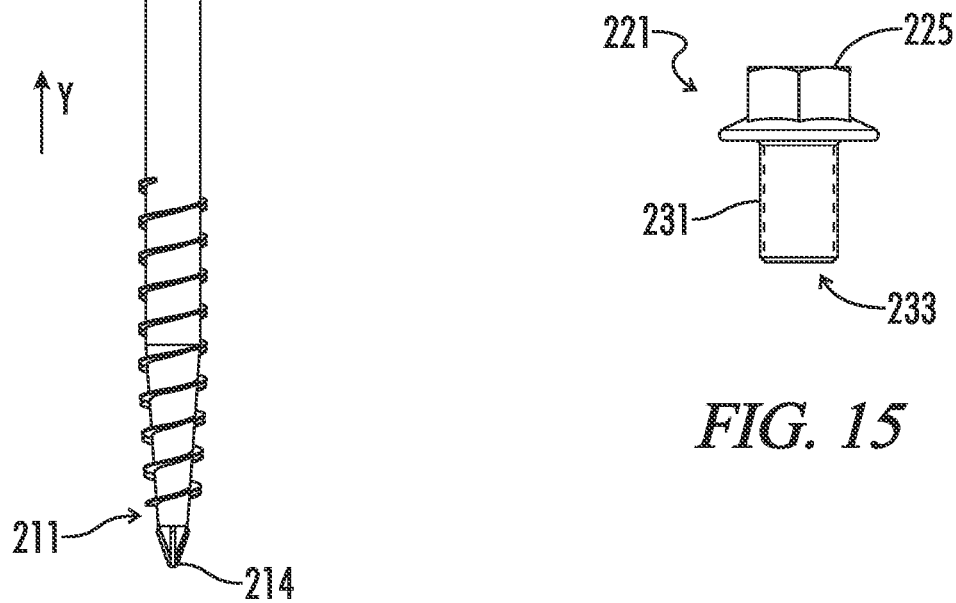
FIG. 15
FIG. 13

SOLAR PANEL TRACKER SYSTEMS AND METHODS

CROSS REFERENCE TO RELATED APPLICATION

This application claims priority to U.S. Provisional Patent Application No. 62/904,510, entitled "A-Frame Assembly" and filed on Sep. 23, 2019, which is incorporated herein by reference.

RELATED ART

Photovoltaic (PV) solar panels are used to convert sunlight into electrical energy. One or more such solar panels may be mounted on a solar panel tracker system that holds the solar panels and slowly rotates them over the course of a day so that the panels track the sun. That is, the solar panels are slowly rotated so that the light-receiving surface of each solar panel continues to face the sun as it passes from east to west during the course of a day, thereby helping to maximize the amount of sunlight that is received and converted into electrical energy.

An array of solar panels can be extremely heavy, thereby placing considerable load on the solar panel tracker system on which it is mounted. In addition, the solar panels are often used in harsh, outdoor environments where high winds and weight from snow can induce considerable additional loads on the solar panel tracker system. Thus, solar tracker systems need to be designed to bear significant loads and are often complex and expensive to build and install.

In addition, in some cases, it may be desirable to install solar panel arrays on uneven or sloped terrain, thereby creating further complexities in design and installation. It is generally desirable for the solar panel tracker system to accommodate such terrain while still maintaining sufficient mechanical integrity to support the solar power panels. In addition, it is desirable for the solar panel tracker system to be designed to facilitate installation and reduce the likelihood that the system will be installed incorrectly or in a manner that might compromise the mechanical integrity of the system.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 13 is a side view illustrating a telescoping support structure for supporting a frame of a solar panel tracker system, such as is depicted by FIG. 1.

FIG. 14 is a top view illustrating the telescoping support structure depicted by FIG. 13.

FIG. 15 is a perspective view illustrating a set screw for securing an inner member of the telescoping support structure depicted by FIG. 13.

DETAILED DESCRIPTION

The present disclosure generally pertains to solar panel tracker systems that are highly reliable and facilitate installation particularly on terrains that are uneven or sloped. In some embodiments, a solar panel tracker system includes a frame having a plurality of legs that are coupled to and support a base for a bushing housing assembly that is designed to support and rotate one or more photovoltaic (PV) solar power panels. Each of the legs is connected to a telescoping support structure that can be adjusted in a vertical direction to accommodate a desired height above sloping terrain. In some embodiments, each of the legs is connected to its respective telescoping support structure with a coupler (e.g., a bolt) passing through a slotted bracket thereby allowing adjustment of the leg in a horizontal direction during installation. In addition, the bushing housing base may be coupled to the frame with one or more U-bolts thereby allowing the bushing housing base and thus the bushing housing assembly to rotate. The adjustments permitted by the system help to relieve stresses induced by installation misalignments, thereby reducing the overall loads that must be borne by the system.

Figure 1:
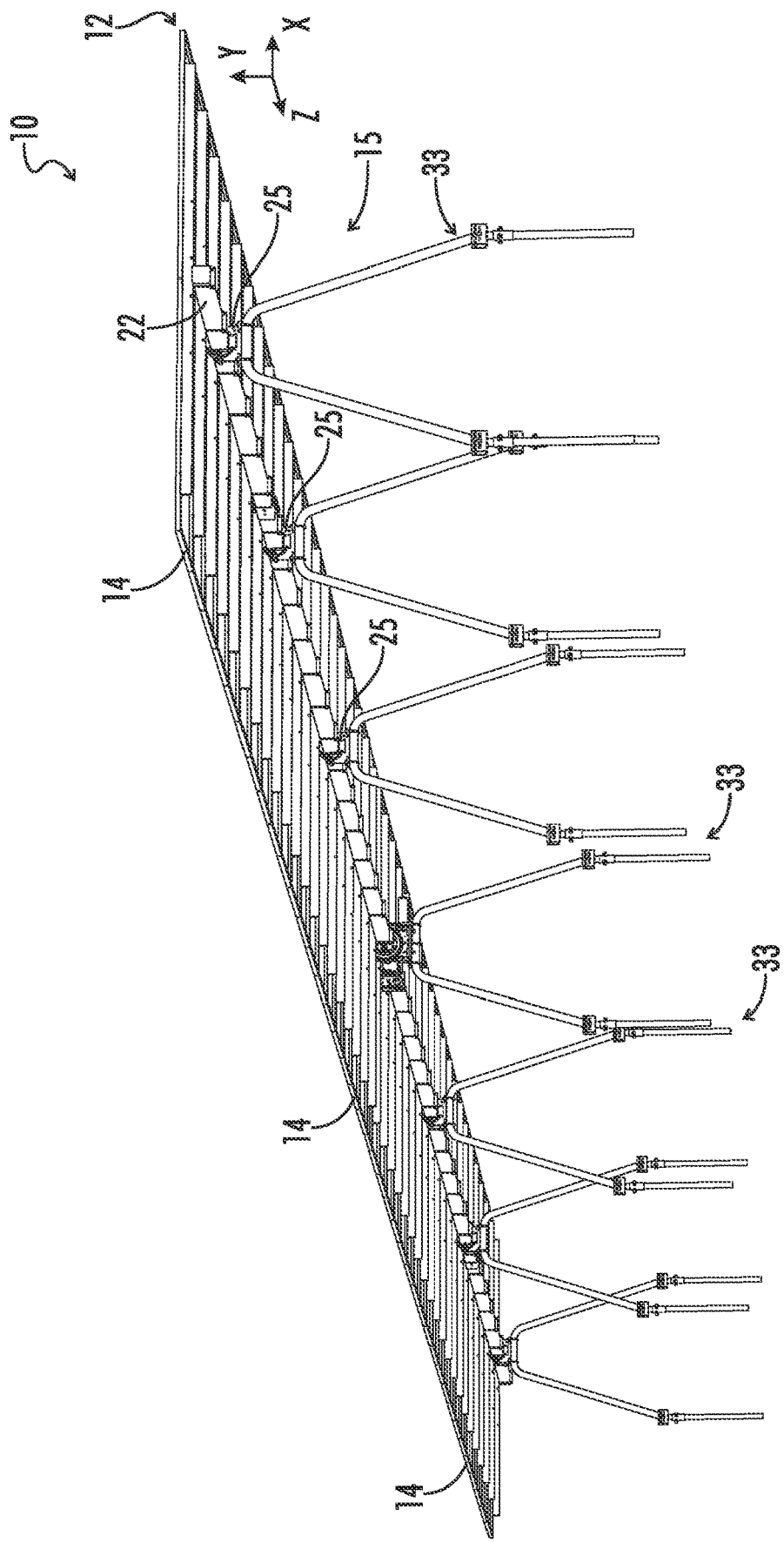
FIG. 1 is a perspective view illustrating an embodiment of a solar power system having an array of solar power panels mounted on a solar panel tracker system in accordance with the present disclosure.

FIG. 1 depicts a solar power system 10 having an array 12 of PV solar power panels 14 that are configured to convert sunlight into electrical energy. The array 12 is mounted on a solar panel tracker system 15. As shown by FIG. 1, the solar panel tracker system 15 has a torque tube 22 that extends in a z-direction from one end of the array 12 to the opposite end of the array 12. Each solar power panel 14 is mounted on and coupled to the torque tube 22.

At various points along the z-direction, the torque tube 22 is coupled to a respective bushing housing assembly 25 that is mounted on a support frame 33. Each bushing housing assembly 25 has a motor (not specifically shown) that is configured to rotate the torque tube 22 and, thus, the solar power panels 14 mounted on the torque tube 22. As an example, as the sun moves from east to west during the day, the solar power panels 14 may be rotated so that the surface of each panel 14 for receiving sunlight faces the sun (e.g., remains substantially perpendicular to the direction of sunlight), thereby increasing the operational efficiency of the solar power panels 14.

Figure 2:
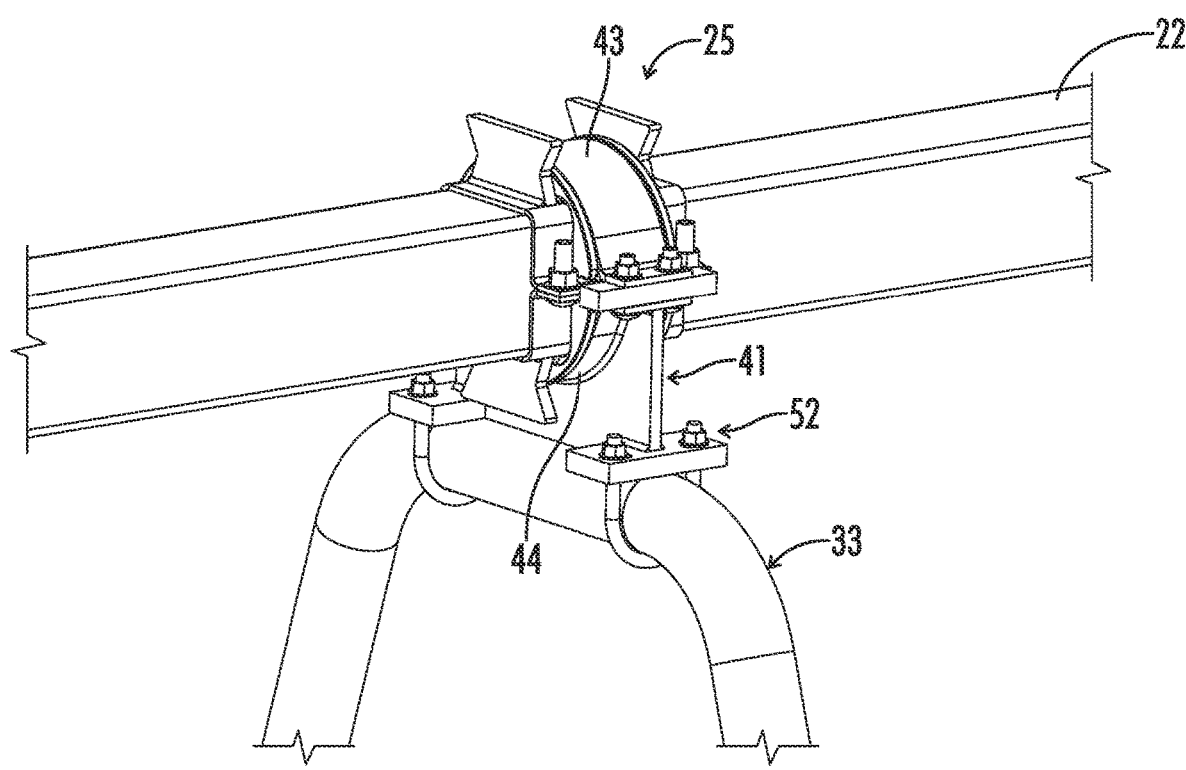
FIG. 2 is a perspective view illustrating a bushing housing assembly for a solar panel tracker system, such as is depicted by FIG. 1.
Figure 3:
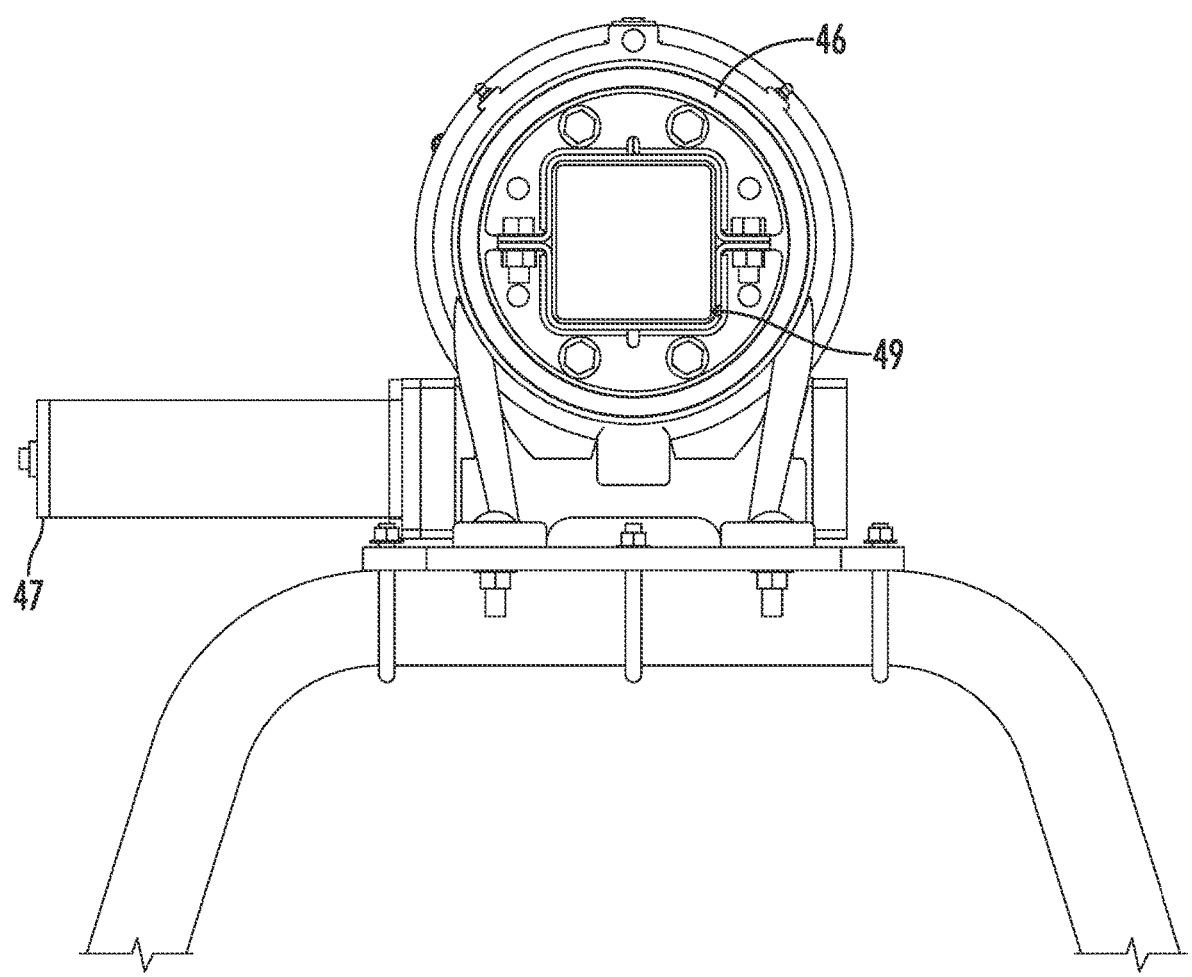
FIG. 3 is a front view illustrating the bushing housing assembly of FIG. 2 with various components removed to expose a busing within the bushing housing assembly.

FIG. 2 shows an exemplary embodiment of a bushing housing assembly 25. As shown by FIG. 2, the busing housing assembly 25 has a base 41 (referred to herein as "bushing housing base") that is mounted on a support frame 33. A top cover 43 is clamped or otherwise connected to the base 41. The top cover 43 and base 41 are shaped and dimensioned to hold a rotatable bushing (not visible in FIG. 2) that holds the torque tube 22. FIG. 3 shows an exemplary bushing 46 having a hole 49 for receiving the torque tube 22, which has a square cross-section in the embodiments shown by the drawings although the tube 22 may have other shapes in other embodiments. The bushing 46 is circular in the embodiment shown by FIG. 3, but the bushing 46 may have other shapes in other embodiments. The bushing 46 is connected to a motor 47 that applies mechanical force to the bushing 46 in order to rotate the bushing 46, thereby rotating the torque tube 22. Bushing housing assemblies are well-known components of solar panel tracker systems, and any conventional bushing housing assembly may be used as may be desired.

Figure 4:
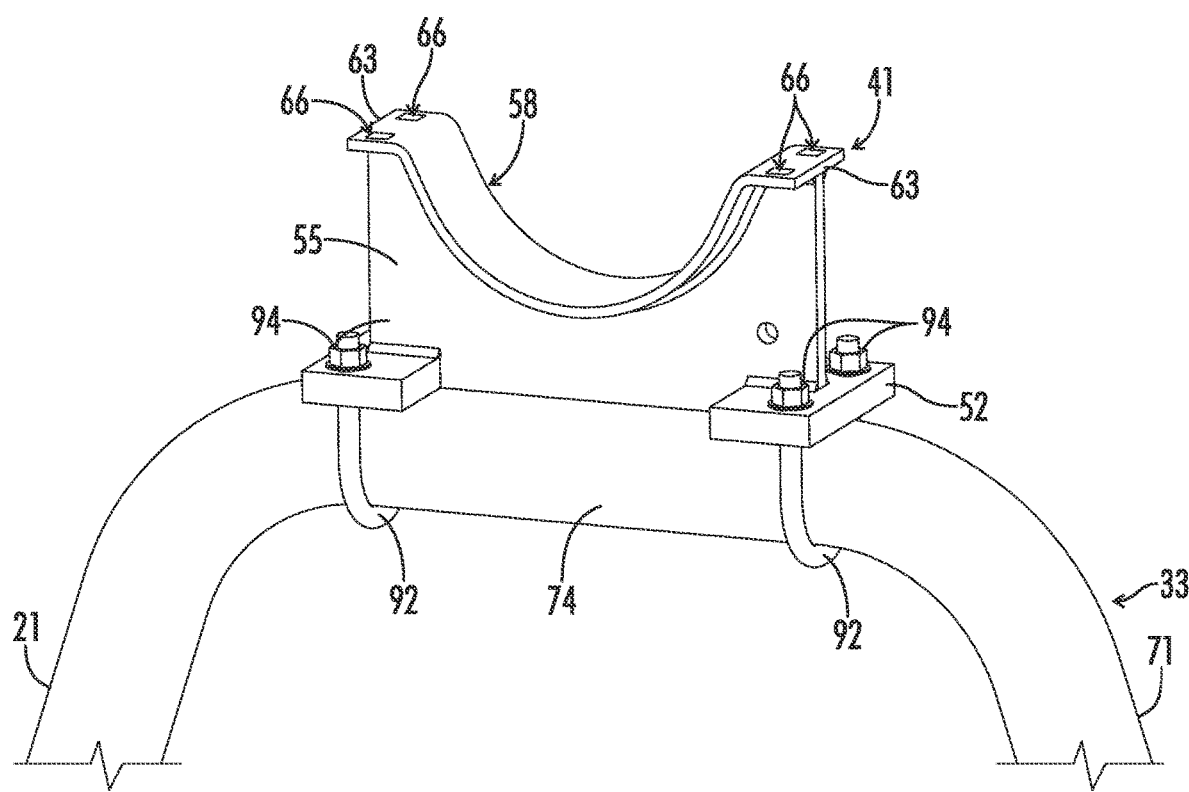
FIG. 4 is a perspective view illustrating a base of a bushing housing assembly, such as is depicted by FIG. 2, mounted on a frame of a solar panel tracker system, such as is depicted by FIG. 1.

FIG. 4 depicts an exemplary embodiment of a bushing housing base 41 mounted on a support frame 33. The bushing house base 41 has a baseplate 52 from which a holding structure 55 extends. The holding structure 55 has an upper surface 58 that is curved for receiving the bushing 46 (FIG. 3) that holds the torque tube 22 (FIG. 2). Tabs 63 extend from opposite ends of the holding structure 55, and these tabs 63 are used to connect the holding structure 55 to the top cover 43 (FIG. 2). As an example, each tab 63 has holes 66 through which bolts or other couplers may pass to connect the tabs 63 to similar tabs or other portions of the top cover 43. In other embodiments, other techniques and configurations may be used to connect the holding structure 55 to the top cover 43.

Figure 5:
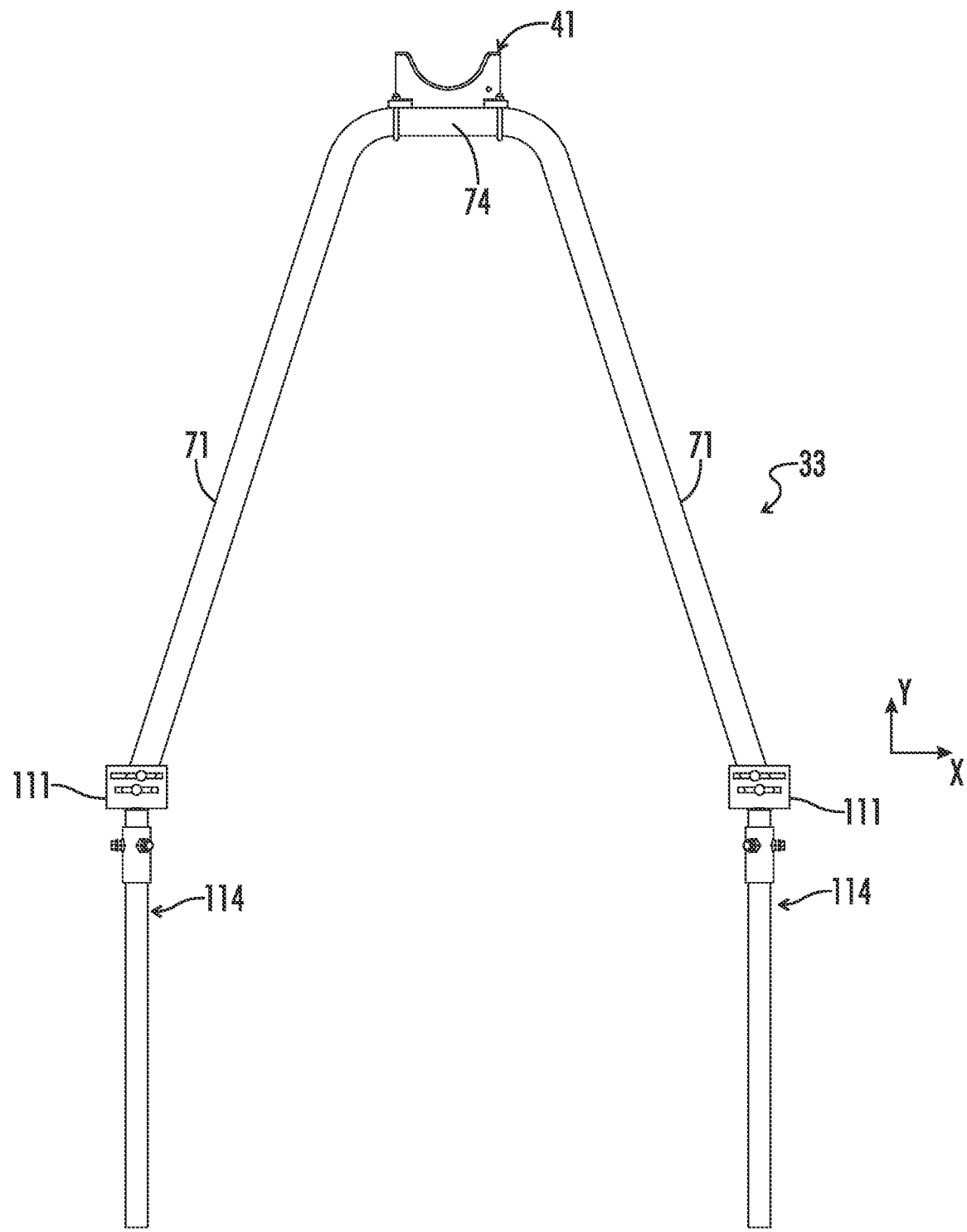
FIG. 5 is a front view of the base and frame depicted by FIG. 4.

FIG. 5 depicts an exemplary embodiment of a support frame 33 having a pair of legs 71 that extend downward from a section 74 that is coupled to the bushing housing base 41. In the exemplary embodiment depicted by FIG. 5, the frame 33 is of a unitary design composed of steel or other high-strength material. Specifically, the frame 33 comprises a single beam that is bent in order to form the shape shown by FIG. 5. Thus, the structure may be shaped to form a structure sometimes referred to as "A frame" having legs 71 that are angled so that the legs are farther apart at their ends as shown, forming an "A" shape. Using a unitary frame 33 facilitates installation since it eliminates steps for assembling the frame 33. Further, a unitary frame 33 may be less expensive to manufacture and, in some cases, bear loads more efficiently. However, in other embodiments, it is unnecessary for the frame 33 to be unitary.

Figure 6:
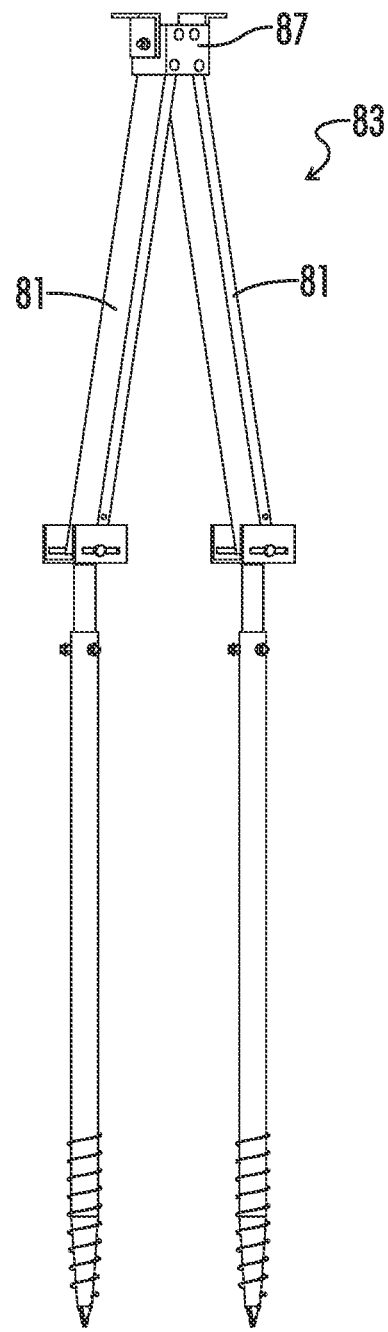
FIG. 6 is a perspective view illustrating an embodiment of a frame for a solar panel tracker system.

As an example, FIG. 6 shows an exemplary embodiment in which a non-unitary support frame 83 is used in place of the unitary support frame 33. The legs 81 are angled such that the structure of FIG. 6 forms an A-frame, similar to the structure 33 shown by FIG. 5. However, the frame 83 shown by FIG. 6 has a pair of legs 81 that are joined together by a collar 87 that is connected to each of the legs 81. In other embodiments, other configurations of a support frame are possible. As an example, other techniques and configurations may be used to connect a support frame to the bushing housing base 41, or the support frame 33 may have any number of legs 71 in other embodiments. Further, if desired, the legs 71 may be parallel rather than angled. For illustrative purposes, unless otherwise indicated herein, the support frame 33 will be described in the context of forming an A-frame, as shown by FIG. 5, and shall be referred to hereafter as "A-frame." However, it should be emphasized that other types of structures for the frame 33 are possible in other embodiments.

Figures 16, 17:
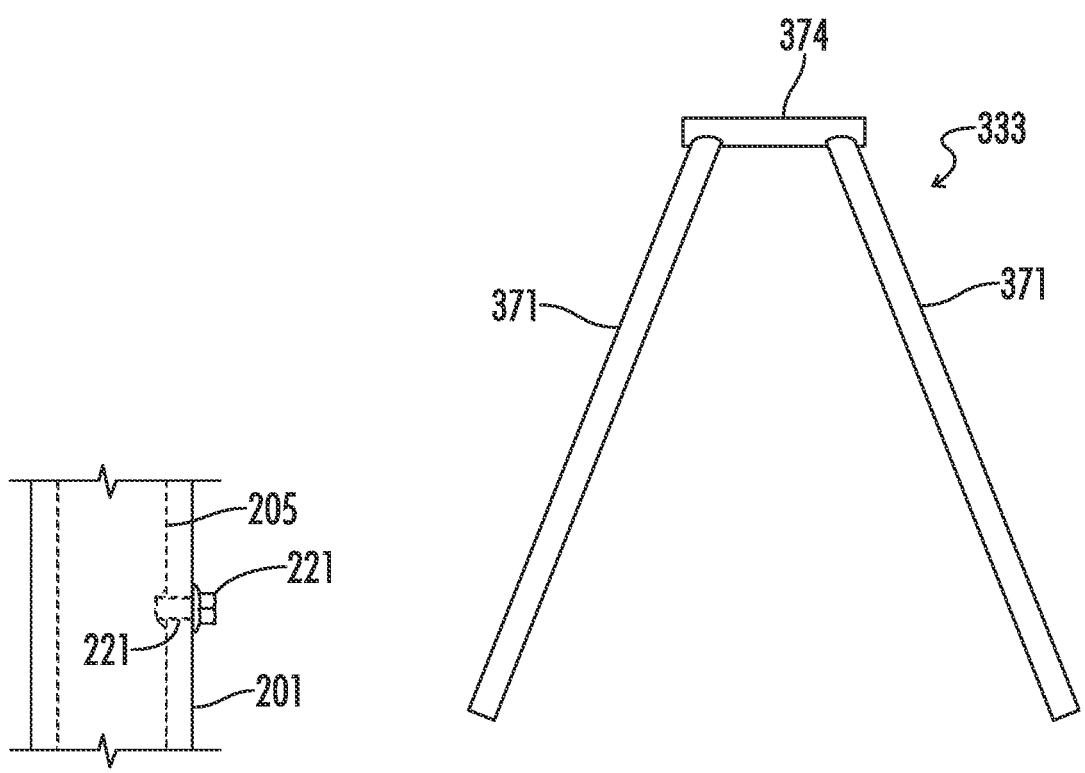
FIG. 16 is perspective view illustrating the telescoping support structure depicted by FIG. 13 after set screws have deformed the inner member of the telescoping support structure.
FIG. 17 is perspective view illustrating an embodiment of a frame for a solar panel tracker system, such as is depicted by FIG. 1.

In FIG. 5, the section 74 forms a horizontal beam that is bent at each end to form the legs 71 that extend from the section 74. The section 74 and legs 71 have a circular cross-section in the embodiment depicted by FIGS. 4 and 5, but the A-frame 33 may have other cross-sectional shapes in other embodiments. FIG. 17 shows an embodiment of an A-frame 333 that may be used in place of the A-frame 33. The A-frame 333 has a section 374 forming a horizontal beam from which legs 371 extend at angles for forming an "A" shape. Yet other configuration of a support frame are possible in other embodiments.

Note that there are various techniques and configurations that may be used to connect the busing housing base 41 to the A-frame 33. In one embodiment, one or more curved couplers 92, such as U-bolts, are used to make the connection. In FIG. 4, a pair of curved couplers 92 are used, but any number of couplers 92 may be used in other embodiments. In the embodiment shown by FIG. 4, the couplers 92 comprise U-bolts and will be referred to as such hereafter. However, it should be emphasized that other types of couplers 92 including both curved and straight may be used in other embodiments, such as other types bolts, screws, clamps or other types of devices conventionally used for mounting bushing housing assemblies or other structures.

Figure 7:
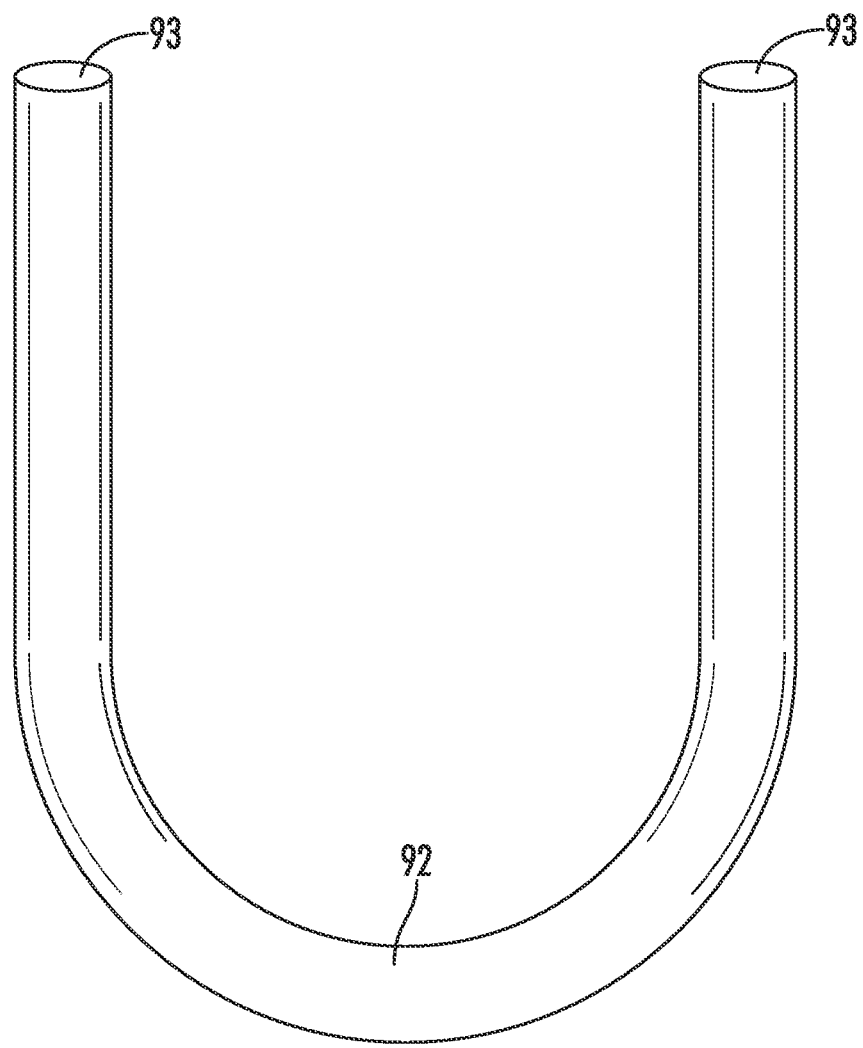
FIG. 7 is a perspective view illustrating a U-bolt for securing a base of a bushing housing assembly to a frame, such as is depicted by FIG. 4.

As shown by FIGS. 4 and 7, each U-bolt 92 has ends 93 that pass through the baseplate 52, and each U-bolt 92 extends around the section 74 of the A-frame 33 on which the base 41 is mounted. Each end 93 of the U-bolt 92 may be threaded so that a nut 94 may be screwed on the end 93 to tighten the U-bolt 92 to the baseplate 52. Notably, the design of the U-bolt 92 allows adjustability of the base 41 during installation. That is, during installation, the bushing housing base 41 may be connected as shown by FIG. 4 with nuts 94 screwed onto the U-bolt ends 93. In this arrangement, the U-bolt 93 is secured to the baseplate 52 and holds the baseplate 52 such that the frame 33 supports the weight of at least the baseplate 52 and the other components of the bushing housing assembly 25 on the baseplate 52. However, the base 41 may be rotated relative to the A-frame 33 to help align, relative to the torque tube 22, the base 41 and thus the bushing 46 (FIG. 3) positioned within the cavity defined by the curved surface 58. Once the base 41 is rotated about the A-frame 33 to a desired position, the nuts 94 can be tightened to increase frictional forces between the section 74 and the baseplate 52 that resist further rotation of the base 41 about the section 74.

As shown by FIG. 5, an end of each leg 71 is coupled to a respective bracket 111 that is connected to a support structure 114. In some embodiments, each bracket 111 is welded to its respective structure 114, but other techniques for mounting or connecting a bracket 111 to its respective support structure 114 are possible in other embodiments. Each bracket 111 and support structure 114 may be composed of steel or some other high-strength material.

Figure 8:
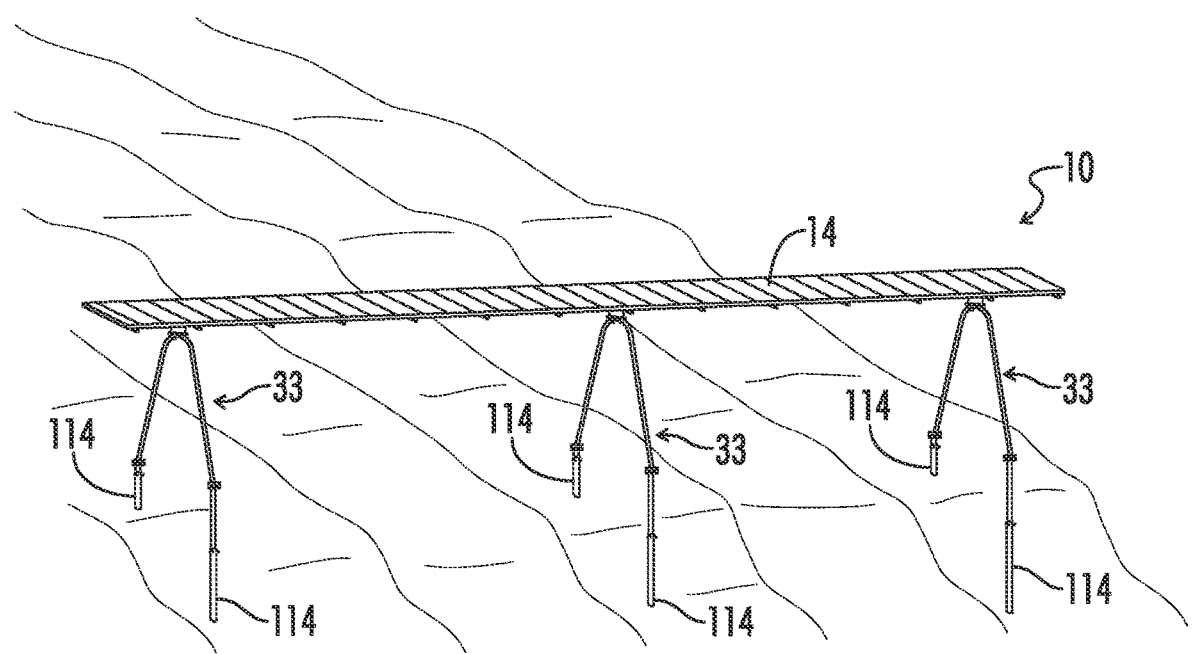
FIG. 8 is a perspective view illustrating a solar power system, such as is depicted by FIG. 1, installed on sloping terrain.

The length (in the y-direction) of each support structure 114 is preferably adjustable, as will be described in more detail below, although it is possible for the length of any support structure 114 to be fixed in other embodiments. By allowing adjustability in the length of a support structure 114, a height of the support structure 114 above ground may be selected to accommodate a sloping terrain, as shown by FIG. 8. In this regard, a height of at least one support structure 114 above ground may be adjusted so that the brackets 111 are substantially level (e.g., at the same height above sea level) even though one of the brackets 111 may be at a different height above ground relative to the height above ground of the other bracket 111, as shown by FIG. 8. In other embodiments, the adjustability of the support structures 114 may be used to selectively control the heights of the brackets 111 in other ways as may be desired.

Figure 9:
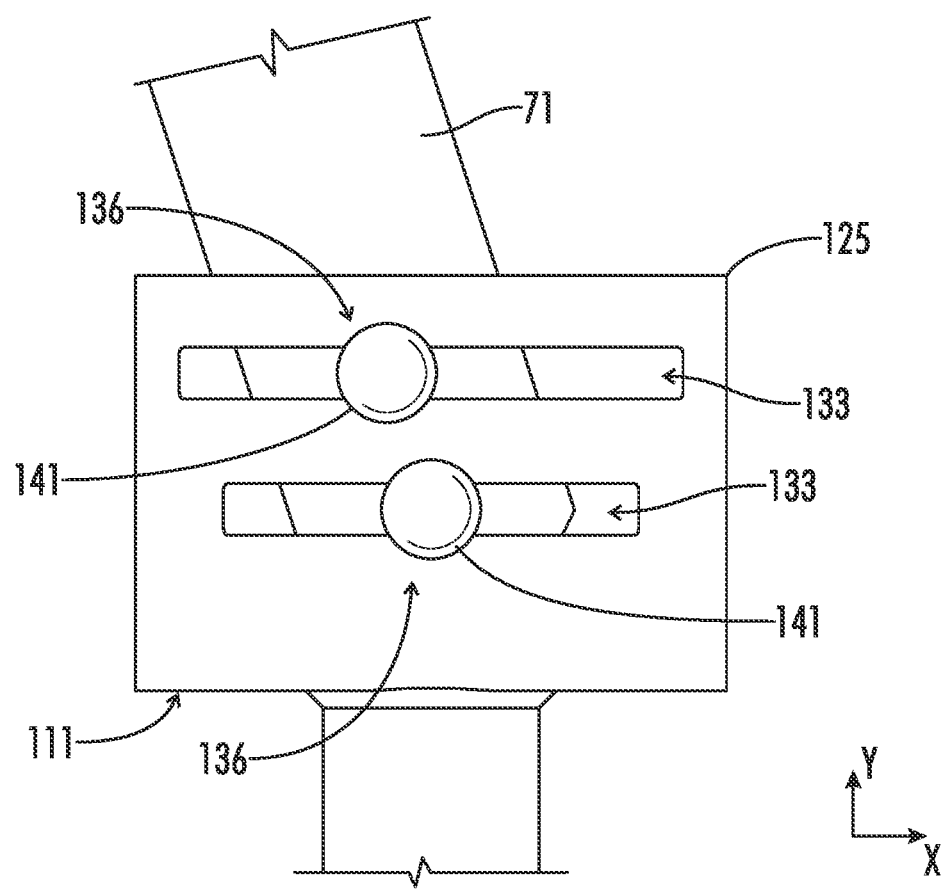
FIG. 9 is a side view illustrating an embodiment of a bracket coupled to a leg of a frame for a solar panel tracker system, such as is depicted by FIG. 1.
Figure 10:
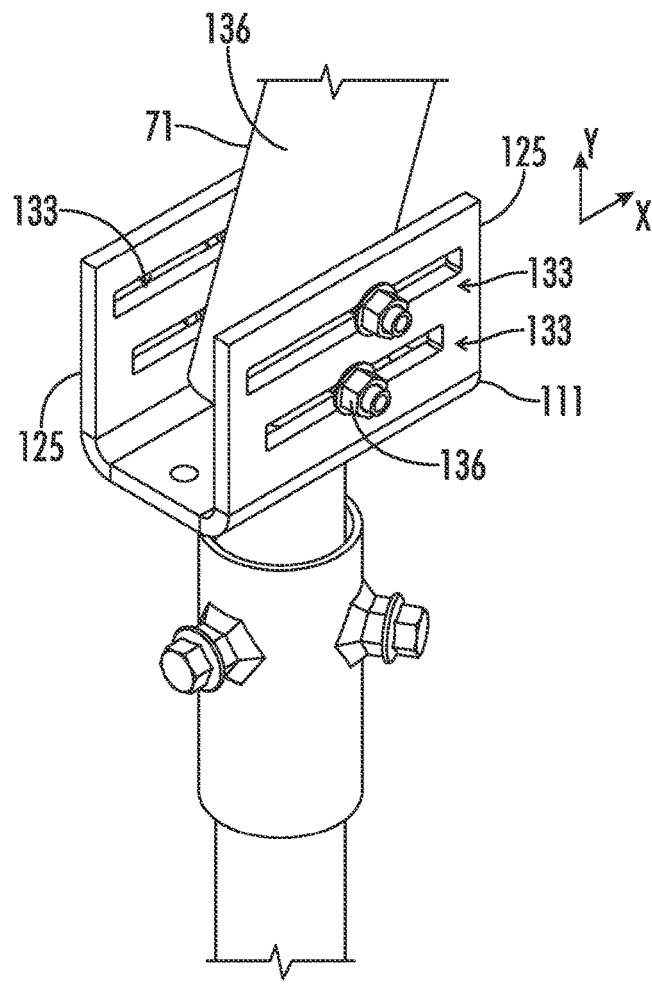
FIG. 10 is a perspective view illustrating the bracket coupled to the leg depicted by FIG. 9.
Figure 11:
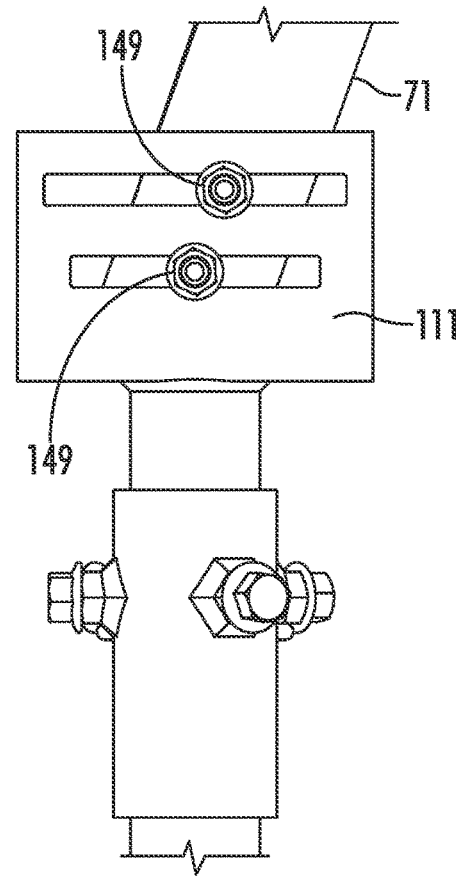
FIG. 11 is a side view illustrating the bracket coupled to the leg depicted by FIG. 9.

FIGS. 9-11 depict an exemplary embodiment of a bracket 111. The exemplary bracket 111, as best shown by FIG. 10, is essentially U-shaped. As an example, each bracket 111 may comprise a plate of steel or other high-strength material that has been bent or otherwise shaped for forming vertical opposing walls 125 between which an end of a leg 71 of the A-frame 33 (FIG. 5) may be positioned. Each wall 125 has a plurality of elongated slots 133 for receiving couplers 136 used for securing the leg 71 to the bracket 111.

Figure 12:
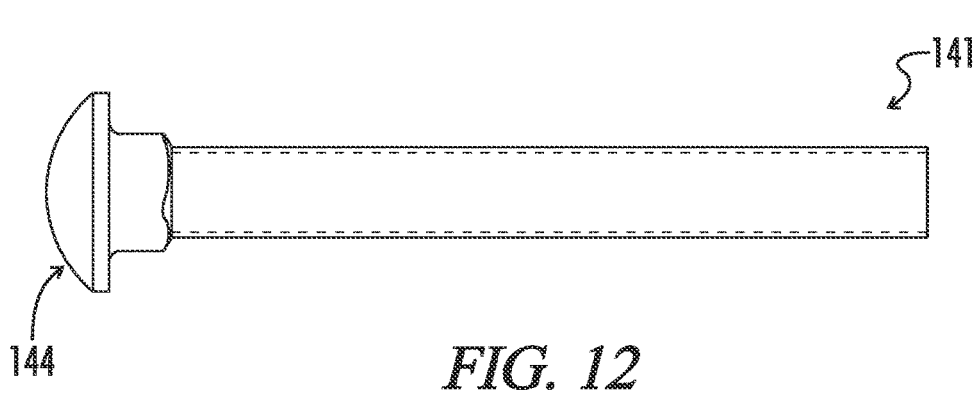
FIG. 12 is a perspective view illustrating a bolt for coupling the bracket to the leg depicted by FIG. 9.

In some embodiments, each coupler 136 comprises a bolt 141, as shown by FIG. 12. In this regard, the bolt 141 has a head 144 dimensioned to have a width larger than a width (in the y-direction) of the slot 133 into which the bolt 141 is inserted such that the head 144 cannot pass through the slot 133, noting that a length (in the x-direction) of the slot 133 may be greater than the width of head 144. As shown by FIG. 12, the bolt 141 may be threaded such that a nut 149 may be screwed on the end of the bolt 141 to secure the bolt 141 to the bracket 111. That is, the nut 149 may be sufficiently tightened such that frictional forces between the bolt 141 and the bracket 111 prevent the bolt 141 from sliding or otherwise moving in the slot 133. Further, since the bolt 141 passes through the end of the leg 71, the bolt 141 secures the end of the leg 71 to the bracket 111 such that it does not move relative to the bracket 111. As shown by FIG. 9, each vertical wall 111 has two slots 133 with a respective bolt 141 passing through each slot 133 and the leg 71. However, in other embodiments, any number of slots 133 and/or bolts 141 may be used. As an example, it is possible to use a single slot 133 and bolt 141 or a greater number of slots 133 and/or bolts 141.

Before the nuts 149 are tightened on the bolts 141 during installation, as described above, each bolt 141 is permitted to move along the slot 133 through which it passes. Thus, the end of the leg 71 is permitted to move back and forth along the x-direction until the nuts 149 are tightened. This permits adjustability of the ends of the legs 71 in the x-direction in order to accommodate alignment issues between the A-frame 33 and the busing housing assembly 25 during installation, thereby facilitating installation.

In this regard, during installation, misalignments between the bushing housing assembly 25 and the torque tube 22 or the A-frame 33 can induce shearing stresses and other types of loads for which it is desirable to prevent or at least reduce. In an effort to help accommodate misalignments and alleviate these stresses, the solar panel tracker system 15 may be arranged as shown without tightening the nuts 149 for the bolts 141 passing through the legs 71 and the nuts 94 for the U-bolts 92 passing through the baseplate 52 of the bushing housing base 41. Before the nuts 94, 149 are tightened, the A-frame 33 and support structures 114 may be used to support weight, but adjustability between the bushing housing assembly 25 and the A-frame 33 and between the A-frame 33 and brackets 111 are permitted. Specifically, the bushing housing assembly 25 is secured to the section 74 of the A-frame 33, but the base 41 of the bushing housing assembly 25 is permitted to rotate relative to the A-frame 33. In addition, the legs 71 are secured to the brackets 111, but the ends of the legs 71 are permitted to move in the x-direction relative to the brackets 111.

Once the bushing housing base 41 is appropriately positioned relative to the A-frame 33 to accommodate misalignment issues and thus relieve stress, the nuts 94 may be tightened such that further movement between the base 41 and the A-frame 33 is prevented. Further, once the end of each leg 71 is appropriately positioned relative to its respective bracket 111 to accommodate misalignment issues and thus relieve stress, the nuts 149 may be tightened such that further movement between the leg 71 and its respective bracket 111 is prevented.

Note that there are various techniques and configurations that may be used to permit adjustability in the height of a support structure 114. For illustrative purposes, an exemplary support structure 114 for permitting height adjustments will be described in more detail below. However, it should be emphasized that other configurations of the support structure 114 are possible in other embodiments. Further, it is unnecessary for a support structure 114 to be used on each leg 71 of the A-frame 33. As an example, one leg 71 may be inserted into ground and the other leg 71 may be coupled to an adjustable support structure 114 for adjusting its height to account for sloping terrain. Yet other changes and modifications are possible.

FIG. 13 depicts an exemplary embodiment of a support structure 114. The support structure 114 has a pair of telescoping members: a hollow outer member 201 and an inner member 205 that is within the outer member 201 and is movable in the y-direction with respect to the outer member 201. That is, the inner member 205 telescopes within the outer member 201 so that the overall height (in the y-direction) of the support structure 114 is adjustable.

As shown by FIG. 13, one end 211 of the outer member 201 is tapered and forms a point 214 to facilitate insertion of the outer member 201 into the ground. In the embodiment depicted by FIG. 13, a lower portion of the outer member 201, including tapered end 211, is threaded so that the outer member 201 can be screwed into the ground. Note it is unnecessary for the outer member 201 to be threaded, and other techniques may be used to insert the end 211 into the ground. As an example, it is possible to dig a hole in the ground, place the end 211 into the hole and then cover the end 211 with soil, concrete, or other material so that the end 211 is secured in the ground.

The inner member 205 has an end that is connected (e.g., welded) to a bracket 111. In some embodiments, the inner member 205 is a hollow or solid pipe that concentrically fits within the hollow region of the outer member 201. The inner member 205 is preferably moved in the y-direction such that the inner member 205 slides within the outer member 201, thereby changing for overall height of the structure 114 until the bracket 211 is positioned at a desired height. The inner member 205 is then secured to the outer member 201 such that further relative movement between the two members 201, 205 is prevented.

Note that there are a variety of techniques and configurations that may be used to secure the inner member 205 to the outer member 201. In some embodiments, the structure 114 has at least one securing device 221 used to secure the inner member 205 to the outer member 201. In the embodiment depicted by FIG. 13, each securing device is implemented as a U-bolt and will be referred to as such hereafter. However, other types of securing devices may be used in other embodiments.

As shown by FIG. 15, each set screw has a head 225 and an end 231 that is threaded and passes through a hole in the outer member 201. Such end forms a flat surface 233 that presses against the inner member 205 when the screw 221 is rotated relative to the outer member 201. In this regard, when the inner member 205 is to be secured, each set screw 221 is screwed into the outer member 201 until the surface 233 of the set screw 221 presses against and deforms the wall of the inner member 205, as shown by FIG. 16. The presence of the set screw 221 within this deformed region of the inner member 205 helps to prevent the inner member 205 from moving relative to the outer member 201. Specifically, attempting to move the inner member 205 relative to the outer member 201 causes the deformed wall of the inner member 205 to press against the set screw 221, which resists movement of the inner member 205. Having multiple set screws 221 screwed into the outer member 201 and deforming the inner member 205 in this way helps to ensure that inner member 205 remains stationary to the outer member 201 despite considerable force that may be applied to the inner member 205 by the weight of the bushing housing assembly 25 and solar panel array 12. Note that any number of set screws 221 (e.g., one or more) may be used, and as noted above, it is possible to secure the inner member 205 using other couplers, such as bolts, screws, clamps, and other devices conventionally used for securing one component to another.

During installation, a support structure 114 for each leg 71 of the A-frame 33 may be inserted into the ground, and the bracket 211 of the support structure 114 may be moved in the y-direction until it is at the desired height for connection to the respective leg 71 of the A-frame 33. At this point, the set screws 221 may be screwed into the outer member 201 of the support structure 114 until they press against and deform the inner member 205, thereby securing the inner member 205 such that movement of the inner member 205 relative to the outer member 201 is prevented. By separately establishing a desired height above ground level for each support structure 114, a slope in the terrain at the location of the A-frame 33 can be accommodated. Further, as noted above, to accommodate misalignments in the tracker system 15 caused by sloping terrain or other factors, the position of the legs 71 of the A-frame relative to the brackets 211 in the x-direction can be adjusted and also the bushing housing base 41 can be rotated relative to the A-frame 33. Once the desired positions are obtained during installation, such positions can be locked so that they are maintained over time during normal operation.

Thus, in various embodiments described above, the process of installing a solar panel tracker system 15 is facilitated despite sloping terrain that otherwise could pose problems and create misalignments that induce considerable stresses. In addition, to the extent that misalignments occur, such misalignments can be corrected by adjusting the positioning of the A-frame 33. Thus, a reliable and robust solar panel tracker system 15 can be installed in relatively difficult environments at relatively low costs compared to other conventional systems and techniques.

Now, therefore, the following is claimed:

1. A solar panel tracker system, comprising:
   a support frame having at least a first leg and a second leg;
   a bushing housing assembly mounted on the support frame, the bushing housing assembly having a base and coupled to a torque tube on which at least one photovoltaic solar panel is mounted, the bushing housing assembly configured to rotate the torque tube;
   a first support structure having a first end and a second end, the first end of the first support structure coupled to the first leg of the support frame, the first support structure having an outer member and an inner member that is telescoped within the outer member, the first support structure having at least one securing device for securing the inner member such that relative movement between the inner member and the outer member is prevented by the at least one securing device; and
   a first bracket connected to the first end of the first support structure for coupling the first end of the first support structure to the first leg of the support frame, wherein the first bracket has a first elongated slot, and wherein the first bracket is coupled to the first leg by a first coupler passing through the first elongated slot.

2. The system of claim 1, further comprising a second support structure having a first end and a second end, the first end of the second support structure coupled to the second leg of the support frame.

3. The system of claim 2, wherein the second end of the first support structure is inserted into ground, and wherein the second end of the second support structure inserted into ground.

4. The system of claim 1, wherein the at least one securing device comprises a set screw passing through the outer member and pressing against the inner member such that the inner member is deformed by pressure from the set screw.

5. The system of claim 1, further comprising at least one U-bolt coupling the base of the bushing housing assembly to the support frame.

6. The system of claim 1, wherein the first coupler comprises a bolt.

7. The system of claim 1, further comprising:
   a second support structure having a first end and a second end, the first end of the second support structure coupled to the second leg of the support frame; and
   a second bracket connected to the first end of the second support structure for coupling the first end of the second support structure to the second leg of the support frame, wherein the second bracket has a second elongated slot, and wherein the second bracket is coupled to the second leg by a second coupler passing through the second elongated slot.

8. The system of claim 1, wherein the first end of the first support structure is tapered.

9. The system of claim 8, wherein the first end of the first support structure is threaded.

10. A method of installing a solar panel tracker system, comprising: mounting a bushing housing assembly on a support frame having at least a first let and a second leg;
   coupling the bushing housing assembly to a torque tube for enabling the bushing housing assembly to rotate the toque tube and at least one photovoltaic solar panel coupled to the torque tube;
   coupling a first end of a first support structure to the first leg of the support frame, the first support structure having an inner member telescoped within an outer member;
   moving the inner member within the outer member thereby adjusting an overall length of the first support structure;
   securing the inner member to the outer member with at least one securing device thereby preventing further movement of the inner member relative to the outer member; and coupling, with a first bracket, the first end of the first support structure to the first leg of the support frame, wherein the first bracket is connected to the first end of the first support structure, wherein the first bracket has a first elongated slot, and wherein the coupling the first end of the first support structure to the first leg of the support frame comprises passing a coupler through the first elongated slot.

11. The method of claim 10, further comprising coupling a first end of a second support structure to the second leg of the support frame.

12. The method of claim 11, further comprising:
inserting a second end of the first support structure into ground; and
inserting a second end of the second support structure into ground.

13. The method of claim 10, wherein the at least one securing device comprises a set screw, wherein the securing comprises passing the set screw through the outer member such that the set screw presses against and deforms the inner member.

14. The method of claim 10, wherein the mounting comprises coupling the base of the bushing housing assembly to the support frame with at least one U-bolt.

15. The method of claim 10, wherein the first coupler comprises a bolt.

16. The method of claim 10, further comprising coupling, with a second bracket, a first end of a second support structure to the second leg of the support frame, wherein the second bracket is connected to the first end of the second support structure, wherein the second support structure has an inner member telescoped within an outer member, wherein the second bracket has a second elongated slot, and wherein the coupling the first end of the second support structure to the second leg of the support frame comprises passing a second coupler through the second elongated slot.

17. The method of claim 10, wherein the first end of the first support structure is tapered.

18. The method of claim 17, wherein the first end of the first support structure is threaded.

19. The method of claim 14, wherein the coupling the base of the bushing housing assembly to the support frame is performed such that the U-bolt passes around the support frame and through the base of the bushing housing assembly.

20. The system of claim 5, wherein the U-bolt passes around the support frame and through the base of the bushing housing assembly.

* * * * *